United States Patent [19]

Pryor

[11] Patent Number: 4,774,751
[45] Date of Patent: * Oct. 4, 1988

[54] ELECTRO-OPTICAL AND ROBOTIC CASTING QUALITY ASSURANCE

[75] Inventor: Timothy R. Pryor, Tecumseh, Canada

[73] Assignee: Diffracto, Ltd., Ontario, Canada

[ * ] Notice: The portion of the term of this patent subsequent to Oct. 11, 2000 has been disclaimed.

[21] Appl. No.: 926,110

[22] Filed: Nov. 3, 1986

Related U.S. Application Data

[63] Continuation of Ser. No. 830,490, Feb. 18, 1986, Pat. No. 4,620,353, which is a continuation of Ser. No. 541,578, Oct. 13, 1983, abandoned, which is a continuation of Ser. No. 273,385, Jun. 15, 1981, Pat. No. 4,409,718.

[51] Int. Cl.$^4$ .............................................. B23Q 17/00
[52] U.S. Cl. ...................................... 29/407; 364/506
[58] Field of Search .................... 29/407; 161/4.1, 457, 161/155, 150; 219/121 LH, 121 LS; 364/506

[56] References Cited

U.S. PATENT DOCUMENTS

| | | | |
|---|---|---|---|
| 3,633,010 | 1/1972 | Svetlichny | 364/506 |
| 3,837,198 | 9/1974 | Higgins | 29/407 |
| 4,160,168 | 7/1979 | Funch | 164/155 |
| 4,210,192 | 7/1980 | Lavenchy et al. | 164/457 |
| 4,469,164 | 9/1984 | Ishikawa et al. | 164/457 |
| 4,545,420 | 10/1985 | Christman et al. | 164/150 |
| 4,556,099 | 12/1985 | Yamamoto et al. | 164/150 |
| 4,558,421 | 12/1985 | Shriver | 164/457 |

FOREIGN PATENT DOCUMENTS 0065841 12/1982 European Pat. Off. ............ 164/457

Primary Examiner—Carl E. Hall
Assistant Examiner—Irene Cuda
Attorney, Agent, or Firm—Larson & Taylor

[57] ABSTRACT

This invention relates to improvements in foundry procedures, particularly in-process and post process inspection with electro-optical sensor units. Principally addressed are: inspection of molds and cores to assure correctness and control procedures to abort pouring if the molds are not correct, inspection of cores on the core line, inspection of patterns for sticking sand, inspection of finished castings for extraneous material in passages, excessive or inadequate stock, correct locator relationships, etc., and control of robotic flash grinders.

Both fixed and programmably moveable sensors are shown in the context of these embodiments.

10 Claims, 4 Drawing Sheets

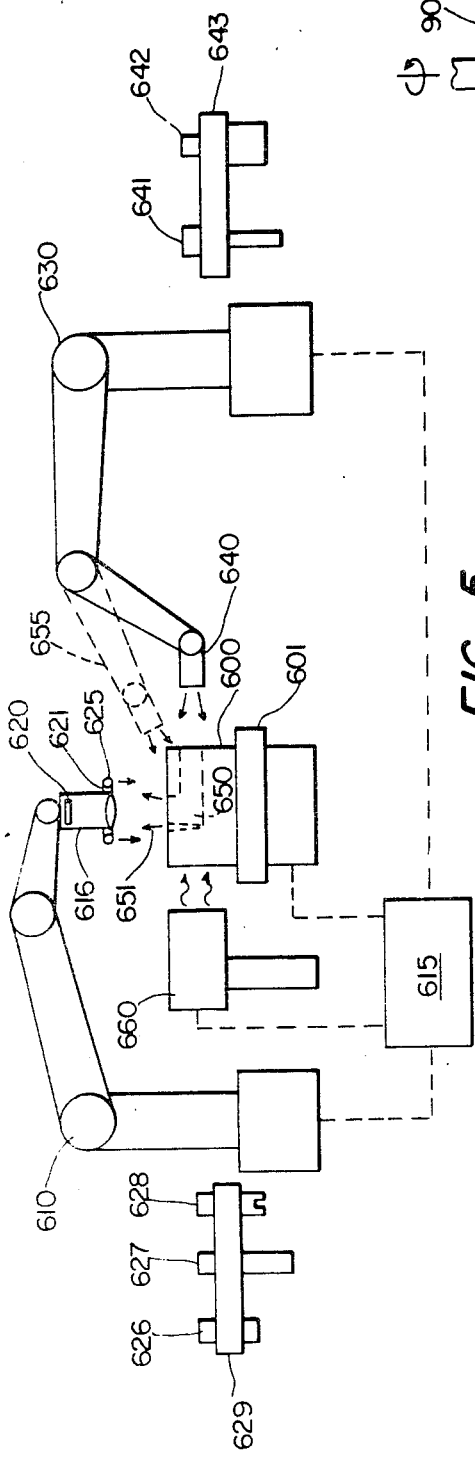
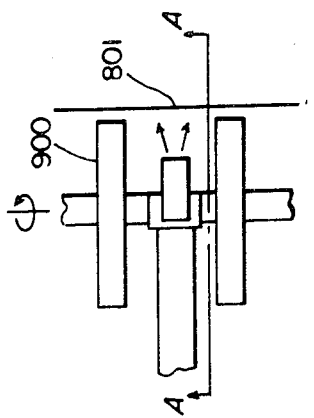
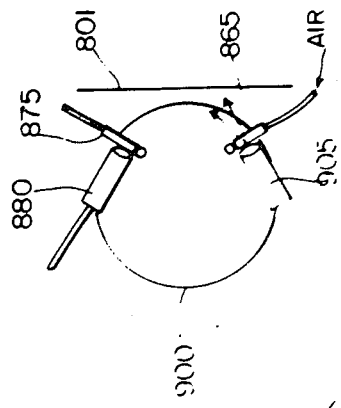
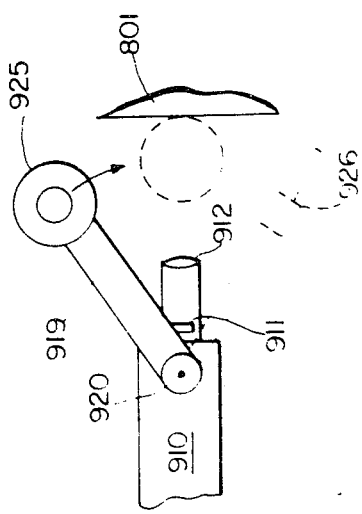
FIG. 5
FIG. 6B
FIG. 6C

ELECTRO-OPTICAL AND ROBOTIC CASTING QUALITY ASSURANCE

This is a continuation of application Ser. No. 830,490 filed Feb. 18, 1986, (now U.S. Pat. No. 4,620,353) which is a continuation of application Ser. No. 541,578 filed Oct. 13, 1983; now abandoned which is a continuation of application Ser. No. 273,385 (now U.S. Pat. No. 4,409,718) filed June 15, 1981.

BACKGROUND

Modern casting practice has tended toward lighter weight castings utilizing less metal and capable of withstanding higher stresses. This means that higher tolerance casting procedures must be employed. Furthermore, to improve productivity, a paramount consideration today, procedures must be taken to reduce tha amount of scrapage and visual inspection labor that is required in present day foundry practices. There is no sense pouring metal, for example, into a mold that is no good, only to scrap the casting later.

In addition to that problem, if one is capable of producing scrap, one must also inspect for this. Inspection costs a lot of money and what is worse is many visual inspection procedures miss the problem which then gets out into the field and becomes a warranty and customer satisfaction problem of the first order.

Because of the above, there exists a great need in current foundries for electro-optically based inspection utilizing both fixed optical sensors and programmable ones capable of being moved to different locations on different parts or to a number of different locations on the same part. The invention is described in several embodiments:

FIG. 1 describes an embodiment for the in-line inspection of high volume drag molds on a mold line using a nest of fixed electro-optical sensors of various types with control capability to abort the pour if incorrect conditions are discovered. A recording capability for statistical data on the molds is also provided.

FIG. 5 and FIG. 5A illustrate a programmable coordinate measuring or robotic type inspection system for castings and in particular cylinder head castings to determine surface finish, hole diameters, blocked passages, overall dimensions, presence of proper locator stock etc.

FIG. 6, FIG. 6A, FIG. 6B, FIG. 6C and FIG. 6D illustrate various embodiments of a sensing system for a robotically controlled flash grinder for cylinder heads and other parts.

FIG. 1

Figure 1:
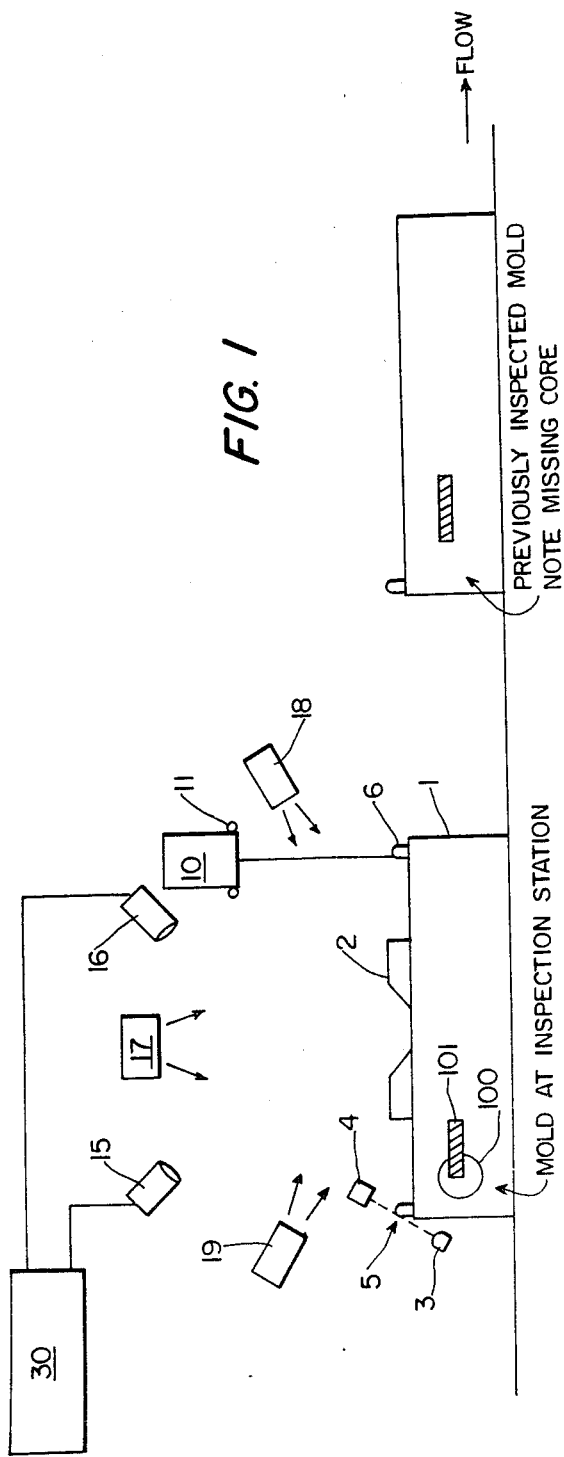

FIG. 1 illustrates a system to inspect molds on a continuous mold line for any or all of the following:
cores are complete (not missing pieces)
cores are properly positioned in drag mold (alignment, height)
sand in molds is correct size and no damage
pins and pin holes in cope and drag mold are correct size and in good enough condition to allow proper mating.

If conditions above are all good then a signal is given by the system to a down stream operation to pour metal. If not, no metal is poured, saving money in scrap and inspection. Other savings are warranty repair and prevention of machine damage. For example, if cores shift changing alignment can produce cylinder bore walls in engine block which are too thin. If cores are missing or sand is damaged, one can get blocked water or manifold passages, or too much metal to machine which damages subsequent machines, lowering productivity.

Basic components of the system are:

(1) One or more image scanners or cameras (solid state matrix diode array preferred)

(2) Lighting to highlight features where possible, preferably one or more flashed (strobe) Xenon lamps to "freeze" part in position, since the mold line is typically in continuous motion.

(3) Control micro computer, generally reprogrammable for different parts (most lines run with different parts intermixed and/or periodically changed).

As shown, engine block casting "drag" molds (1) are moving end to end in their respective mold cars with cores (2) in place. When pin 5 on drag mold is sensed by tripping beam from sender 3 on receiver 4, any or all of the following steps are performed.

Matrix TV camera 10 and ring flash 11 plus a companion unit at the other end (not shown) scan pin 6 and/or pin hole for the spacing of the two pins or holes, their roundness and diameter so as to assure correct fit up with the cope mold (to be placed later on top of the drag mold, with the two halves, cope and drag, making a complete mold ready for pouring).

One or more matrix array or other cameras such as 15 and 16 in conjunction with flashed light sources such as 17, 18, and 19 successively flashed, also take in data into micro computer 30 concerning core presence, completeness and alignment in the drag mold. Also sand feature data concerning the mold is also taken in.

Because the sand and core features are often uniformly black or lacking contact lighting angles are chosen so as to create shadows which can yield reliable dimensional data.

Next the micro computer 30 analyzes the data and makes a decision whether the mold is OK to pour at a downstream station. Also, quantitative data is built up about each mold used to form a statistical data on the various parts and their placement.

In the FIG. 1 system above a complete arrangement of sensors, light sources, part position detectors etc. and computer equipment has been provided to allow the categorization of the molds and the position and character of the cores within them. Clearly, however, not all of the components need be used in any one system. For example, one might just wish to look at the pins in order to say that they were not being worn too much or conversely one might assume that the pins were okay and simply look at the sand or the core etc.

While FIG. 1 only illustrates inspection of the drag mold, it is clear that to make a full representation of the complete mold to be poured, one would also like to look at the cope mold which is the upper one brought down to make a "sandwich". In some lines this is very difficult to do because of the way the lines are constructed and requires looking up using mirrors with blow-offs to keep sand out, etc. On other lines, however, the cope mold is actually transported face up until the point to where it is actually turned over and in this case, the mold can be looked at in much the same way and simply tracked so that the correct cope mold inspection is matched with that of the matching drag mold inspection.

Clearly, the arrangement of the light sources and sensor units above needs to be considered for each of the inspection tasks required. Obviously, it may not be true that the same lighting arrangement which is best for a cylinder head mold and core is also best for the engine block. Further, both of these might typically be run on the same line together. In this case, still more light sources and sensor units would be required so that one could select between them for the best possible delineation of the sand lines, core position and features. Such selection is easy with micro computer 30.

Figure 3:
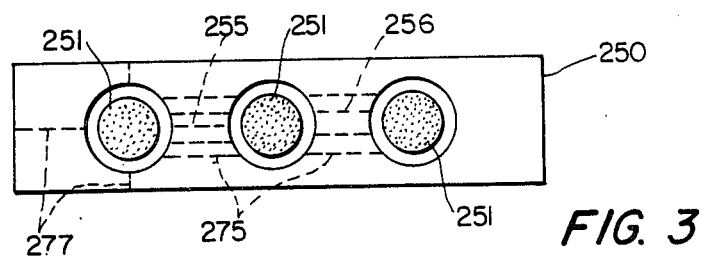
FIG. 3 and FIG. 3A are, respectively, plan and side elevational views of an embodiment employing a fixed type sensing for checking web wall thickness in cylinder block cores on a core line.
Figure 3A:
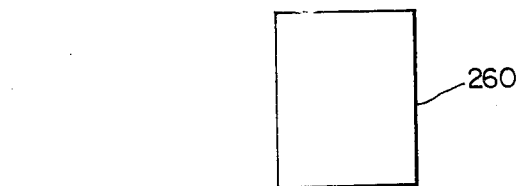

While not shown in the drawing, it is clear that the same sensing of the sand or cores could be performed at other locations, for example, on the core line itself just after the cores have been made and before their insertion into the molds. In this case, the missing parts etc. on a core would surely be desireable to detect at that point before they were placed into the mold. Grossly deformed cores would be of course in the same category. This is illustrated in FIG. 3 which s discussed below.

Regarding the time available, the typical mold lines run fairly fast—one mold every 10 seconds for example. However, if the edge delineation is sufficient, the amount of computer time required to extract data can be kept to a minimum. Clearly, one does not have to see all the possible data points on these molds or cores in order to determine if they are lined up and in reasonably good shape.

It is not difficult to provide for tracking of the mold car to the pour station and to control the pouring operation. Naturally, one would like to keep a tally of those mold cars which have repeat problems in their pins for example and for this reason, optical or magnetic serial numbers on the mold cars would be desirable which could be read out by mold car number and associated with the data taken. A sensor for this is shown in the figure as a device 100 for reading bar code, denoted 101, on the side of the mold car.

The significance of this embodiment should not be underestimated since it is capable of inspecting for most of the variables in the casting process that would cause the block or whatever other casting to be defective. The fact that one does not have to pour that mold at least means that the rework cost and the iron cost, to a degree at least, is saved. One has of course had to go through the effort of putting the sand and cores in the mold and one can utilize a robot or other manipulator to retrieve a good core from a defective sand situation or ideally to even reposition the core if it was out of position. This conceivably could be done manually after sounding an alarm. Indeed with robot core placement one could very easily see this system guiding the core in after first inspecting it.

FIG. 2

Figure 2:
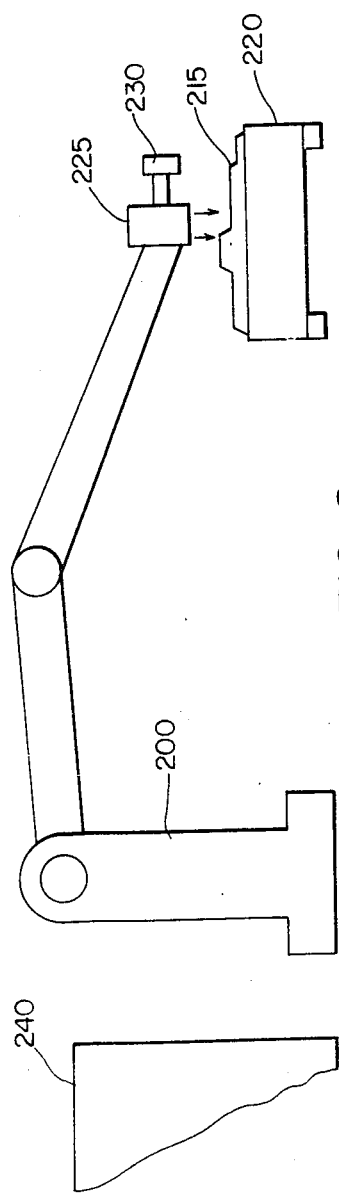
FIG. 2 illustrates an embodiment utilizing a robotically positioned sensor cluster for performing a similar mold inspection. This inspection is more flexible and it can programmably check different molds at different locations etc. at a high resolution but, however, at a lower rate.

FIG. 2 illustrates a alternate type mold inspection utilizing a robot based sensor ensemble. In this particular example, the molds may be either stationary or more typically moving on a mold line. If the latter, the robot control system considers the speed of the line, taking this into account as it causes the robot to move to various positions on the mold for inspection.

Considering FIG. 2, as shown, robot 200 is being used to inspect mold sand and cores 215 in mold car 220 moving on the line.

The sensors utilized are xy matrix camera 225 and optical triangulating ranging sensor 230 of types described in copending application Ser. No. 34,278 now U.S. Pat. No. 4,373,804 issued Feb. 15, 1983. Both sensor units are connected along with the robot to the control computer 240.

To utilize the invention it is simply necessary to pre-program in, or for that matter, teach the robot where on the mold to move the sensor units to. The non-contacting optical sensor units then take in the data from the mold at the positions in question and are used to determine whether or not the molds should be poured as above.

Naturally because the robot is completely flexibly programmed, it can be utilized to move the sensor units to different portions of different molds as desired when mixed production is being run.

In the copending application Ser. No. 34,278 referred to above, a typical sensor unit incorporating both the triangulation sensor 230 and the xy camera type sensor unit 225 can be used (as shown in FIG. 16 of that application). Such a sensor is capable of obtaining complete dimensional data about a part very quickly. In a preferred embodiment of the invention, the robot would move in a continuous path taking data "on-the-fly" while the mold car moved, or for that matter was stationary.

One advantage of the a robot type system, if it can handle the speed requirements, is that it can move the sensor units up quite close to the mold car in a manner which might not be possible for some universal fixture over the line. This allows them to concentrate on certain details very accurately. It does however, have the maintenance problem of moving parts etc. where the FIG. 1 version does not.

The robotic programmable version can also inspect different features on different molds of the same type. For example, if block mold number "thirty-one" was known to have a potential bad pin problem, this could be checked each time, but only periodically on the other molds.

FIG. 3 and FIG. 3A

This embodiment illustrates inspection of the sand core of an engine block casting. As shown in FIG. 3, such a core 250 is composed of sand in those areas where it is desired to have an open space within the finished engine block. The obvious two areas are the cylinder areas 251 and the various water passages between the cylinders 225 and 256 as shown in the remaining shaded area. Particularly of interest are the "webbing zones" between the cylinders 255 and 256 which, if oversize, as illustrated for cylinder 255, causes insufficient cylinder wall thickness and if undersize, as illustrated for cylinder 256, causes insufficient water circulation between the bores.

As illustrated this core passes under the sensor camera, different pictures are taken sequentially of the core areas by trigger means not shown using xy matrix camera to 260 with the core moving on the side by rails 265 and moving on conveyor 270. The various sections indicated at 275 are taken and compared to limits. Naturally the presence of all these given areas can also be determined on any completely misaligned or defective cores are rejected by reject means for marking means not shown. Optionally additional sections such as 277 can be measured as well.

A suitable matrix array can be General Electric TN 2500 while, suitable linear arrays are Reticon 1728H's.

FIG. 4 and FIG. 4A

Figure 4:
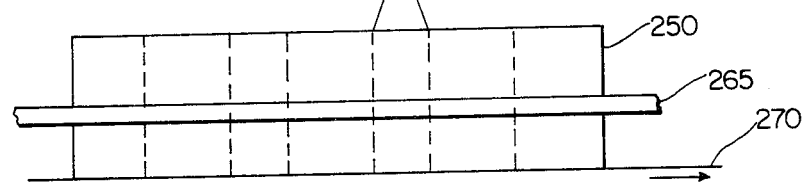
FIG. 4 and FIG. 4A illustrate an inspection apparatus for stickers on patterns on an engine block mold line.

FIG. 4 illustrates an embodiment of the invention utilized for inspection of patterns for "stickers". The pattern used to make a mold is of polished metal which, under tremendous pressure and heat, compresses the sand and forms the mold. As shown in such a pattern for a Vee engine block shown at 500 with projecting sections at 501. The pattern is in its raised position between cycles.

Between cycles then, it is desired to inspect the pattern to see if any residual sand (a "sticker") is sticking to the mold which would cause an indentation in the sand mold and a consequent bulge on the real part. While such sand is typically quite small, it can be a good contrast since it is black on a shiny background.

To practice the invention, an actuator such as robot arm 520 brings the sensor unit 530 into position inside the machine. The sensor unit 530 scans the image of the pattern and determines therefrom if any stickers are present. Because of the presence of sand, etc. falling down from the mold, a shutter device indicated schematically at 553 is used with the sensor to open it up only when necessary to take a picture. A flashed ring light source 540 is utilized and in general it may be required to utilize still further light sources in order to provide a diffusive illumination of the whole pattern surface, such that bright areas appear bright in the image and that false dark conditions are not created by having too little reflected light reach the sensor from the good portions of the metal pattern. Such auxilliary lights are shown as 550 and 551.

A suitable sensor is a matrix array camera GE TN2500.

Instead of shutter 553 one can utilize blow-offs to keep the window clean and such blow-offs or shutters are utilized to advantage in other embodiments shown in this invention since foundry atmospheres typically have sand and other contaminents in the air. This has proved to be no real problem except in general, on those sensor windows which point upward.

Figure 4A:
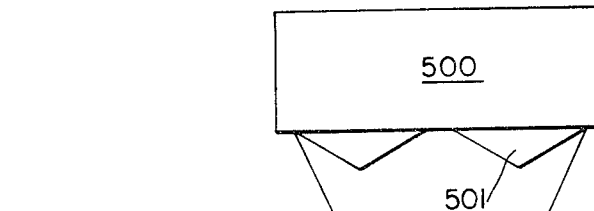
Figure 4A:
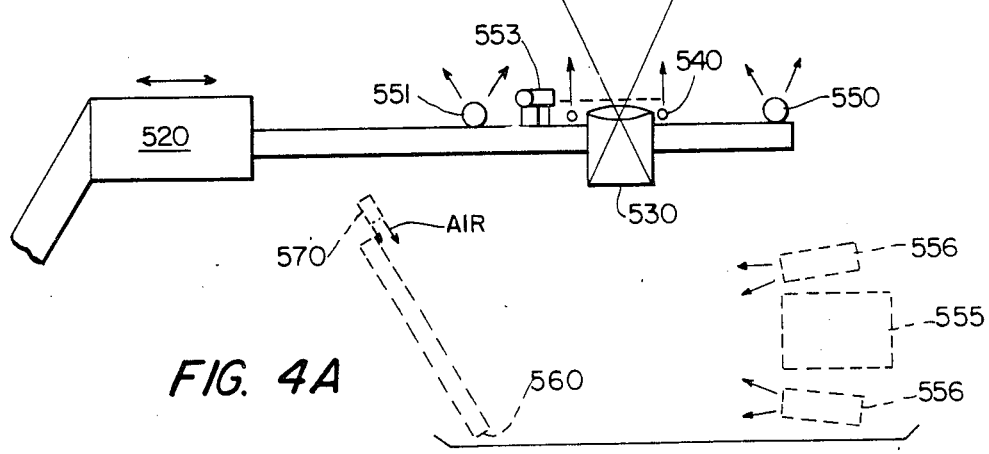

It is also feasible to have the sensor camera 530 located outside the chamber, and a mirror (not shown) placed therein. Indeed, in certain mold conditions, it is not even required to move the mirror in and out since a position in the line is available where the pattern moves through. This is shown in dotted lines in FIG. 4A where the camera unit 555 and light source are located outside the mold area with a fixed mirror, 560, itself equipped with blow-offs 570. It should be noted that the same questions of looking upward at the pattern also applies to looking at the cope mold as in FIG. 1. This cope mold is typically inverted as well on many lines although in this case the pattern can be the one on the bottom. In either case, it stands to reason that the present invention is useful in checking both patterns and molds produced by same.

Figure 5A:
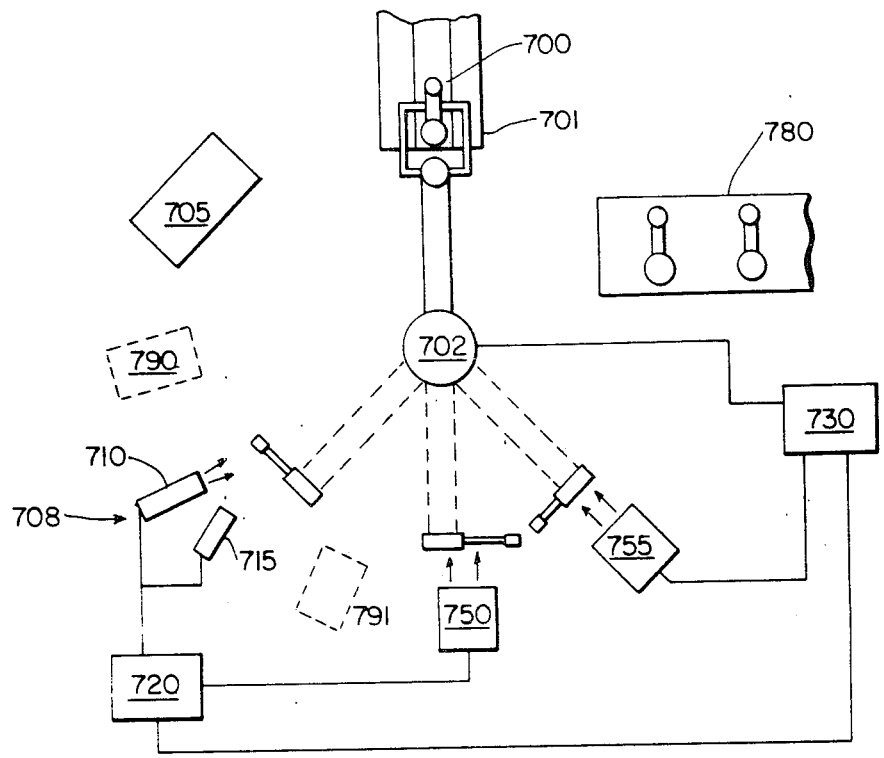

FIG. 5 illustrates a robotic based inpsection system according to the invention, while shown with a polar coordinate robots, cartesian coordinate systems including more conventional coordinate measuring machines (CMM) can be employed.

As shown, a part, in this case a cylinder head 600 mounted on optional turntable 601 is being inspected for various features and conditions. The inspection is performed primarily by robot 610 under control of computer 615. This robot contains one or more electro-optical sensors such as sensor 616 which in this case is a solid state TV camera composed of lens 621 and matrix array 620 used to form an image of the part when illuminated either by external lighting (not shown) or by flashed light source 625 carried with the sensor.

It should be noted that any other sensor described in any of the referenced applications can be used. For example, FIG. 16 of Ser. No. 34,278 referred to above also shows a similar sensor but equipped additionally with sensors for range. Multiple sensors can be used simultaneously, if desired.

Also of great value is the use of interchangeable or turret tooling. This is illustrated here in the form of different sensor modules 626, 627 and 628 located in "tool" holder 629. The robot can pick these up and utilize them for various other types of inspection. For example, sensor 626 can be a surface contouring sensor, sensor 627 can be a sensor for inspecting for porosity in bores, and sensor 628 can be even a contacting sensor, for example a contact optical type used for certain dimensions.

In the application shown, a somewhat smaller second robot 630 is also shown. This robot also can be equipped with sensors such as 641 and 642 located in its tool holder denoted 643. However, at the moment represented by the diagram, a light source module 640 rather than a sensor module has been picked up by this robot and is being pointed in a one end of a hole of said casting 650 such that the light emerging from the other end 651 can be detected by matrix array 620 and the blockage therein determined.

It can be seen that this system is capable of programmably providing virtually all necessary inspections on a finished casting or for that matter a core or mold etc. It is primarily meant for off-line use although, again, in-line checking can also be performed if one alternates the checks from part to part or if the line is sufficiently slow given the number of checks involved.

It should be noted that the matrix array 620 can be used not only to check the surface features and dimensions of the part, but also to read certain bar codes (such as 101 in FIG. 1) that might be written on a part by laser or other marking units.

In this case, a laser marking unit as shown at 660 is used for marking a serialized bar code on a painted surface of the casting as a result of the various dimensions and data taken by the robotic system. The marking unit receives its information from control computer 615. This data can then be fed to subsequent processes in the machine line etc. based on dimensional data and other things taken at this station.

Other methods other than laser markers can be used but a laser marker has been found to produce extremely clear bar codes readable by remote or hand-held laser and wand scanners which can be economically used at other positions throughout the plant.

This is also highly useful for inventory control and other purposes.

While not shown for clarity, other robots or automation can be used to turn the part over as well as to look at the side which is obscured laying on the turntable 601. Indeed, either of the robots present can do the turnover by substituting suitable tooling for a sensor. Naturally the turntable itself can be used to present other sides to the robot or robots utilized and there is no limit to the number that can be utilized to perform this inspection. Whatever is convenient or cost effective can be used. Each robot present too can draw its sensor tooling from the same storage area as well.

One very important inspection on a cylinder head is to inspect the combustion chamber shape and the volume thereof or the shape of the chamber 670 relative to certain locating surfaces such as 671. This check can also be performed at this station and results recorded if desired with the serial number put on by the laser.

Furthermore, the sensing unit of FIG. 5 can be used before machining to qualify castings, both dimensionally and for passage blockage, presence of excess flash, certain types of visible porosity and the like. The invention can also be used as will be described below at this stage for automatic defect inspection via x-ray or penetrant inspections. It is noted that in this case, that the penetrant inspection can also be performed with the hardware here disclosed as will now be described.

One of the most interesting aspects of this invention is that the data obtained in the inspection unit of FIG. 5 and others can be coded and passed forward to the subsequent machining processes. This is particularly interesting when a serial number is put on as shown with a laser (or other suitable means) since this allows the part to go anywhere in random fashion and still carry the data with it in the main control computer associated with the serial number.

If the casting data is so carried, it can be used to adjust the machines for different casting conditions allowing otherwise scrap parts to be utilized and preventing the machining of parts which would turn out to be scrap. This is a particularly important feature when one thinks of the automated factory where very little inspection and manpower is available for checking the parts going into the machines. It is also noted that this adds a capability really not possible with human inspection in that all pertinent aspects of the casting can be checked and their data fed to the machine tools.

Suitable parameters to adjust on the tools would certainly include the position of the casting locators relative to other points to be machined which would then tell the machine just how far in to cut. If excess material was present, the machine control computer could take this into account and allow a longer cycle time or a tool change as needed. The same would hold true if it is known that the tools are dull and that there is a particularly large amount of material to cut. Further, that part could either not be cut at that pass and placed aside until more time was available, or the tooling could be changed. Naturally, if there is excess flash present, the machine could further be instructed to take that flash out automatically. Conversely, if the flash was in the way of the location, this head could be put over to a rework area.

In terms of defects, such as porosity, cracks and so on, naturally these would be prevented from going to the machine automatically and the knowledge that the part contains such defects would be stored in the computer and utilized to control that part to ensure that it did not reach the machining cycle without correction.

As has been mentioned, automated penetrant inspection can indeed be done. For example, in the case of FIG. 5, we may consider that each of the robots could be holding, in this case, an ultra violet projector 616 and a TV camera 640 for example, or vice versa. In any case, the TV camera would be positioned to zoom in on certain critical areas of interest that were illuminated with the ultra violet lamp. By having the ultra violet lamp positionable, a large amount of light can be concentrated in a small area. Similarly, by having the field of view of the camera unit directed at the fluorescent indications of cracks etc. when treated with penetrant type preparation such as "Zyglo" or "Magneglow" (trade marks of the Magneflux Corp), a much higher magnification of the view is provided.

Accordingly, it is the purpose of this invention to provide for a robotically positionable light source and a camera unit to selectively and sequentially illuminate different parts of a casting to determine the defects therein. As shown in FIG. 5, the source and detecting unit can be separately positionable, however, and this can be useful for obtaining different lighting levels of various curvatures of the part. However, it is also within the realm of the invention to utilize the light source and the detection unit on the same robot or other positioning arm. Suitable signal processing for the crack type indications which can occur is disclosed in the co-owned application Ser. No. 34,278 referred to above.

It is also within the purview of this invention to provide a fully automated line robotically configured for the inspection of castings for defects. This is shown in FIG. 5B and illustrates some of the concepts just discussed as well. For the purpose of illustration, the robot in this case moves the part into varying attitudes and positions, with the sensing and other equipment fixed.

As shown, it is desired to inspect a connecting rod casting 700. FIG. 5B illustrates an interesting example of a complete robotic inspection cell for connecting rod castings. As shown, the connecting rod castings 700 comes in on track 701. A casting 700 is grabbed by robot 702 on its large end and placed in penetrant preparation tank 705 where it is treated by known methods with penetrant and either magnetized or not in order to cause the penetrant to adhere to the cracks if any in the material.

The part is then moved from the penetrant bath to a penetrant inspection station 708 comprising light source 710 and TV camera 715 hooked to computer 720. This computer 720 is also to be connected to the main control computer 730 of the system. This TV picture is such that individual zones of the rod can be sequentially examined with the robot positioning the rod in front of the camera in more or less known orientations.

After this inspection the part is moved by the robot arm, which is again shown in dotted lines (given the fact that it is moveable to each position), to an electro-optical measurement station 750 where different portions of the part are categorized for dimension such as the bore diameters, the flash amounts, oil hole bosses, flange widths etc.

The part is then moved to an optional coding station including a laser marking unit 755 where a paint spray unit applies a paint code and the laser marking unit 755 then burns this away with a bar code representing the various dimension and defect data taken at the previous stations. This typically could be a serial number for the part.

It is noted that the laser mark can go into the metal and be recoverable even if the paint is removed. The parts are then loaded over onto walking beam transfer unit 780 which moves them to a machining area where they are machined.

Intermediate between stations 705 and 708 or between stations 705 and 750 can be a wash unit such as indicated at 790 and 791, respectively, to remove the penetrant chemicals from the part surface.

The robot as shown can take one rod and move it in succession but given the fact that the penetrant preparation 705 can require some time period, may well simply pick up a previously prepared rod from each station and bring it to the next. It is noted of course that the automation for this does not have to be a robot. Other types of automation can be used, however, the robot is very useful for positioning the rod in many degrees of freedom in front of the varying inspection stations as well as into the baths etc. and into the load/unload station as well.

Another application of this invention is in the control of robots for working on castings. This includes one of the most obnoxious jobs in the foundry, viz., the grinding of flash off of castings. This is a noisy, hot, somewhat dangerous job that generally requires considerable amounts of premium labor because of the personnel rotation that must be used to prevent over exposure to the job.

In trying to automate this, one is immediately faced with the fact that in order to make cycle time, one must remove flash only where the flash is and not all over the part. Otherwise, no sort of programmable robotic solution can be entertained because it would simply be too slow if one tried to go everywhere on the part functional surfaces, whether there was flash there or not.

Figure 6:
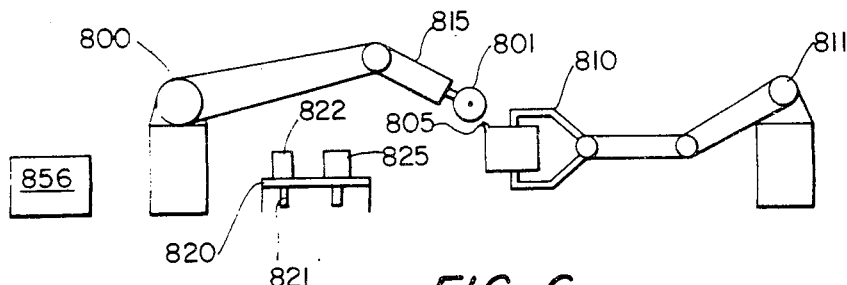
Figure 6A:
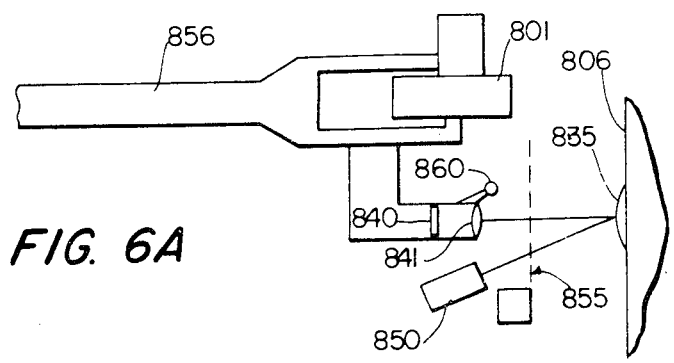

Accordingly, it is an object of this invention to provide a controlled system for "cleaning" castings. For example, in FIG. 6A, there is shown a robotic grinder which is going to remove the flash of a robot as follows:

Robot 800 contains the grinding wheel (or alternatively the mill) 801, which is used to remove the flash stock 805 from the cylinder head bank face 806, with the cylinder head, in this case, being held in the hand 810 of robot 811. It is noted, however, that the cylinder head could be statically clamped to a plate without use of the second robot 811. However, the second robot provides a much more general solution since more degrees of freedom are available. It also stands to reason that something anyway has to bring the part in and out, and this can be the robot itself. The parameters to be determined are the height, breadth and length (in the direction out of the plane of the diagram) of the flash and the location of the flash along the face.

Another problem is that there can be flash in the ports and this cannot be removed by the grinder 801 but must be removed instead by tooling such as a power chisel. For this reason the grinder tooling itself, denoted 801, is shown as being mounted on a receptacle or carrier 815 and it is noted the tooling for the grinder can be replaced into rack 820 which contains a power chisel tooling 821 whose end 822 also fits into receptacle 815.

In the first mode of operation, one can first grab suitable sensor tooling such as 825 also located in the tool change rack. This sensor tooling can typically be matrix diode array (solid state video) camera capable of digitizing the image of the cylinder head flash 805. In this mode of operation, the robot first gets the sensor and essentially uses the sensor in conjunction, if desired, with robot 811 to look over the zone of the bank face 806 and memorizes where the flash is. The robot then goes back, changes the tooling and proceeds to grind the flash where it has been memorized. In this way, the working environment of the grinder or chisel for that matter, is kept removed from that of the sensor.

FIG. 6B illustrates another version showing a combination grinder and sensor unit. In this case, the grinding wheel 801 is accompanied with a sensor unit 830 (which is very much like that of FIG. 16 of Ser. No. 34,278 referred to previously) in that it provides for both range multi-axis measurement of the part location. In this case, the part face 806 is seen to have a bump of flash 835 whose length and width is detected using the matrix array 840 on whose face the image of surface 806 is formed by lens 841 when illuminated lamp 860. For the range (or bump height) dimension in the z axis, a separate light source 850 is employed this time with a diode laser to put a spot or strip of light onto the part as fully disclosed in Ser. No. 34,278 via the triangulation principle.

In this embodiment, a shutter system 855 opens up on command of the control computer of the robot 856 and allows the light from the diode laser 850 and the illumination lamps 860 to illuminate the part taking in the data as to its locations. The shutter then closes down and the robot moves the grinding wheel in to take off that piece. When this operation is completed, the grinding wheel is moved back out of the way, the shutter can be opened and a verification that this flash was removed done. Unlike the embodiment of 6A, this particular unit has immediate feedback of data as to what happened and does not rely on storing of the total coordinates of the part, only those in the local area to be worked. Also, of course, it does not have to go back and get change tooling for the sensor, although it would for the chisel which could be utilized in the same way as the grinder along with the sensor.

One can see that both these applications are quite workable. The remaining one shown in FIG. 6C is to utilize a system which has the minimum time delay between sensing and grinding. In this case, a small shutter unit with a fiber optically remoted image sensor is provided wherein a dual grinding wheel is utilized with a sensor in between. This unit is capable of almost simultaneous monitoring of the surface while grinding. It is only necessary to slightly back off the grinder, open up the sensor and see what happened since the sensor field of view extends to both sides. As shown dual grinding wheel 900 rotates about its axis to grind the face 801 as before. In this case, a fiber optic light module, indicated at, for example, 905, illuminates the surface using a remote lamp (not shown). This fiber optic light module can easily be ¼" or less in width requiring only that amount of space between the grinding wheels. Shutter units 865 with positive air pressure behind them are also utilized as is a shutter unit 875 on the receiving fiber optics 880 used to image the zone of the surface 801 illuminated.

While this embodiment has been described with respect to a single fiber with a 2 axis image, it is clear that another fiber may be used to bring in a light spot just as from laser 850, in FIG. 6B, to provide a triangulation range determination as well. If lens is used to image the light from the surface onto the end of the fiber optics receiver unit thereby getting the data back to a removed TV camera, matrix diode array or the like. The weight of the dual grinding wheel and fibers is very light and can easily be carried by any robot in question for this application.

FIG. 6D shows yet another grinder arrangement. In this case, the end of arm tooling 910 contains built within it a camera unit containing matrix array 911 and lens 912 forming an image of the part 801 as before. In this case, however, a programmably moveable grinding wheel mount 919 around axis 920 is utilized which swings grinding wheel 925 out of the way of the image while the part 801 is being viewed. After the image is digitized, as previously described, the grinding wheel 925 is brought down in to contact with the part and the operation performed. Interestingly, this tooling can also have, optionally swinging out of the other way in the other direction, a power chisel 926, indicated in dashed lines, which then can be used to go after the heavier flash or to operate inside the ports. Naturally this can swing out of the way in any direction and other means than swinging out, such as shuttles etc can also be provided. This approach then is perhaps the ultimate since it allows the simplest sensor design while still retaining almost conventional type tooling.

It should be noted that in all cases the tooling of this application has been shown moving with the robot, it is also obvious that the tool and sensor apparatus can be fixed in one location with a robot such as 811 used to solely manipulate the part into position against the tool/sensor combination. The whole key here is that, robotically, the relationship of the sensor to the part as well as the tooling to the part is controlled.

Besides the grinder shown in FIG. 6D, it is also possible to use other tools for flash trimming and deburring such as milling cutters and the like. It is also noted that force sensors can be provided on the robot arm such as 815 to detect the forces coming back from the part and from that also determine when correct or incorrect conditions are present.

While a grinding wheel has been shown, it is clear that milling, wiring brushing and other casting cleaning processes can also be done in an identical manner and it is clear that by use of the fibers with various tooling, such as chisels etc., one can build in the means to control the robots. For example, the same interchangeable tooling applications described above can also be used to couple light into the power tooling shown here to provide sensing capability.

The embodiment of FIGS. 6, 6B, 6C and 6A relates to a novel concept. Electro-optical sensors can be built into tools in a particularly easy way using fiber optics.

We now explore this concept further not only relative to casting finishing tools, but all tooling in general. Tools with this capability can be used to qualify the part to be worked, finding the work, or inspecting the work during or after using the tool.

Note that 'light' in this disclosure covers all electromagnetic wavelengths x-ray to millimeter wave. However, near uv, visible and near infra red sources are preferred.

In FIG. 5 it is important to note the function of the second robot 650 in positioning light source 640. The programmable light source positioning provided can be crucial not only in illuminating holes, but in accentuating certain edge features for dimensional analysis, e.g. by sensor 620. For example, in position 655 (shown in dashed lines) the robot can illuminate the edge indicated at 656 with much more contrast than can light source 625 carried with the sensor. This can be useful to the utmost part dimension accuracy, not just on castings but finished parts and other objects as well.

It is noted that rather than two robots, one for sensor, the other for the light source, it is often useful to have one robot with two arms, each separately programmable.

What is claimed is:

1. A method for the automatic control of a casting machining operation, said method comprising:
    using electro-optical means at a first location to inspect a casting and obtain data with respect to that casting;
    providing the casting with identifying data which permits the casting to be identified when the casting travels on to a further location;
    transmitting the electro-optically obtained data together said identifying data regarding the specific casting to a main control unit for storage therein;
    transferring the casting with the identifying data to a said further location at which a machining operation is to be carried out;
    identifying the casting based the identifying data and using the data to access the main control unit thereby obtain the electro-optically obtained data for the casting stored in the main control unit; and
    carrying out the machining operation at said further location using the electro-optically obtained data.

2. A method for the automatic control of a casting machining operation as claimed in claim 1 wherein said identifying data is provided by applying a serial number to the casting.

3. A method for the automatic control of a casting machining operation as claimed in claim 2 wherein the serial number is applied using a laser.

4. A method for the automatic control of a casting machining operation as claimed in claim 1 wherein the casting includes casting locators for assisting in machining of the casting, and inspecting of the casting includes determining the position of at least one casting locator relative to at least one point to be machined so as to control how far in a cut is to be made during the machining operation.

5. A method for the automatic control of a casting machining operation as claimed in claim 1 wherein inspecting of the casting includes determining the presence of excess material and wherein said main control unit controls the machining operation accordingly.

6. A method for the automatic control of a casting machining operation as claimed in claim 1 wherein said main control unit determines from the electro-optically obtained data whether the casting has a defect and controls travel of the casting so as to prevent the casting from reaching the further location at which the machining operation takes place unless the defect is corrected.

7. Apparatus for the automatic control of a casting machining operation, said apparatus comprising:
    electro-optical means located at a first station for inspecting a casting so to obtain data with respect to that casting;
    a central memory;
    means for transmitting the data obtained by said electro-optical means, together with data identifying the casting, to said central memory unit for storage therein;
    means for transferring the casting to a further location at which a machining operation is to be carried out; and
    means at said further location for accessing the main memory unit based on the identifying data associated with the casting which has been transferred to the further location so as to obtain the electro-optically obtained data for the casting which is stored in said main memory, and for carrying out the machining operation using the electro-optically obtained data.

8. Apparatus for the automatic control of a casting machining operation according to claim 7 further comprising means for applying said identifying data, in the form of a serial number, to the castings.

9. Apparatus for the automatic control of a casting machining operation according to claim 8 wherein said serial number applying means comprises a laser.

10. Apparatus for the automatic control of a casting machining operation according to claim 8 wherein the castings each include casting locators for assisting in machining of the associated casting and said electro-optical means determines the position of at least one casting locator relative to at least one point to be machined.

* * * * *